(Specimens.)

I. STEINHART.
ASBESTINE LEADEN TEXTURE.

No. 363,018. Patented May 17, 1887.

Lead.
Asbestos.

Witnesses:
W. R. Haight
A. Lichtl

Inventor:
Ignaz Steinhart
by Wm H Babcock
Attorney

UNITED STATES PATENT OFFICE.

IGNAZ STEINHART, OF DRESDEN, SAXONY, GERMANY.

ASBESTINE LEADEN TEXTURE.

SPECIFICATION forming part of Letters Patent No. 363,018, dated May 17, 1887.

Application filed October 25, 1886. Serial No. 217,166. (Specimens.)

*To all whom it may concern:*

Be it known that I, IGNAZ STEINHART, engineer, of Dresden, Freiberger Strasse 26, a citizen of Austria, residing at Dresden, in the Kingdom of Saxony, Germany, have invented certain new and useful Improvements in the Manufacture of Asbestine Leaden Texture; and I do hereby declare the following to be a full, clear, and exact description of the invention, such as will enable others skilled in the art to which it appertains to make and use the same.

This invention relates to improved material for packing steam and other engines and analogous uses.

The object of my invention is to provide an improved packing material for steam-engines, boilers, pipe-joints, and analogous uses, such material being free from the inherent defects of india rubber and asbestus packing as commonly manufactured, india rubber packing being deficient in durability when exposed to heat, and asbestus packing being deficient in tenacity, cohesive, and hygrometrical properties.

My invention consists in a packing material composed of a combination of asbestus and lead, the former being worked in with the latter, to which a finishing-coat of india-rubber is usually applied in order to form a suitable surface.

Figure 1:
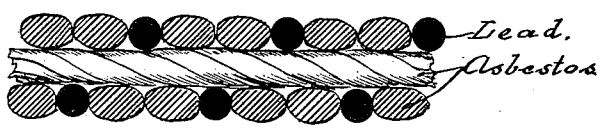
Figure 2:
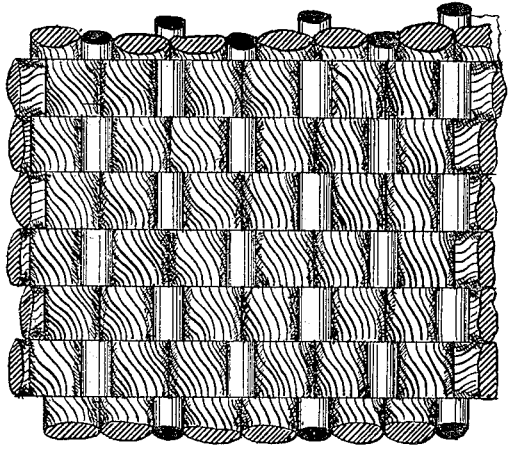

Figure 1 is a sectional view, and Fig. 2 is a surface view, of my packing.

When required to form a steam-tight joint, the material is used in the sheet form, and for other kinds of joints or packing its form is modified in a manner well known; and so long as any of the component parts of the asbestus and lead fabric remain its use can be continued with safety without impairing the security of the joint.

The following are the advantages of my improved packing, as compared with the well-known asbestus and caoutchouc fabric formed with the addition of brass wire.

The asbestus and lead packing act independently of the material forming the object to be rendered steam-tight.

The packing may be applied without difficulty to endure great steam, water, or other pressure, or alternating high and low pressure with safety.

Lead forms the most secure binding material in combination with asbestus packing, regard being had to the nature of asbestus; and such material forms also an efficient impermeable material fully capable of withstanding the action of the acids evolved in or from steam from steam-boilers.

The failure and rupture of asbestus and caoutchouc packing mixed with cotton, wool, and brass-wire netting are avoided, the lead forming a binding-chain therein.

Having now particularly described and ascertained the nature of my said invention and in what manner the same is to be performed, I declare that what I claim is—

1. An improved packing material consisting of spun asbestus thread and lead wire, for the purpose set forth.

2. An improved packing material consisting of spun asbestus thread and lead wire woven together, substantially as described and shown.

In testimony whereof I affix my signature in presence of two witnesses.

IGNAZ STEINHART.

Witnesses:
CARL T. REICHELT,
PAUL DRUCKMÜLLER.